United States Patent
Imine

(10) Patent No.: US 9,594,445 B2
(45) Date of Patent: Mar. 14, 2017

(54) OPERATION RECEPTION DEVICE AND METHOD FOR RECEIVING OPERATION ON PAGE IMAGE, STORAGE MEDIUM, AND IMAGE FORMING APPARATUS FOR USE WITH OPERATION RECEPTION DEVICE

(71) Applicant: CANON KABUSHIKI KAISHA, Tokyo (JP)

(72) Inventor: Ryotaro Imine, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/127,209

(22) PCT Filed: Sep. 11, 2013

(86) PCT No.: PCT/JP2013/075212
§ 371 (c)(1),
(2) Date: Dec. 18, 2013

(87) PCT Pub. No.: WO2014/054424
PCT Pub. Date: Apr. 10, 2014

(65) Prior Publication Data
US 2014/0313140 A1 Oct. 23, 2014

(30) Foreign Application Priority Data

Oct. 1, 2012 (JP) .................. 2012-219603

(51) Int. Cl.
*G06F 3/041* (2006.01)
*G06F 3/0484* (2013.01)
(Continued)

(52) U.S. Cl.
CPC ............ *G06F 3/041* (2013.01); *G06F 1/1626* (2013.01); *G06F 1/1643* (2013.01);
(Continued)

(58) Field of Classification Search
CPC .... G06F 3/041; G06F 3/04842; G06F 1/1626; G06F 1/1643; G06F 3/04883; G06F 2200/1636
See application file for complete search history.

(56) References Cited

U.S. PATENT DOCUMENTS 8,311,393 B2 * 11/2012 Kawaoka ...................... 386/288
2002/0016799 A1 * 2/2002 Nakagiri ................ G06K 15/00
715/246

(Continued)

FOREIGN PATENT DOCUMENTS

JP 2001-265481 A 9/2001
JP 2006-018522 A 1/2006
(Continued)

OTHER PUBLICATIONS

International Search Report for PCT/JP2013/075212, dated Dec. 24, 2013.
(Continued)

*Primary Examiner* — Kumar Patel
*Assistant Examiner* — Sejoon Ahn
(74) *Attorney, Agent, or Firm* — Rossi, Kimms & McDowell LLP

(57) ABSTRACT

An operation reception device capable of detecting and receiving an intuitive operation that resembles an operation of pinching a sheet or sheets between fingers. If it is determined that coordinate positions where operations on the operation reception device that are respectively detected by touch sensors of first and second touch panels provided on the front and back faces of the device are the same as each other, the operation reception device receives designation of at least one selected page on the first touch panel, receives an editing operation on the selected page, and performs, on (Continued)

the selected page, predetermined editing such as deletion and extraction corresponding to the editing operation.

7 Claims, 8 Drawing Sheets

(51) Int. Cl.
    *G06F 1/16*         (2006.01)
    *G06F 3/0488*     (2013.01)

(52) U.S. Cl.
    CPC ...... *G06F 3/04842* (2013.01); *G06F 3/04883* (2013.01); *G06F 2200/1636* (2013.01)

(56) References Cited

U.S. PATENT DOCUMENTS

| | | | |
|---|---|---|---|
| 2003/0197706 A1* | 10/2003 | Isozaki | G09G 3/3611 345/535 |
| 2005/0114798 A1* | 5/2005 | Jiang | G06F 17/30876 715/864 |
| 2006/0001932 A1* | 1/2006 | Sekiguchi | 358/537 |
| 2007/0046657 A1* | 3/2007 | Kadota | G06F 3/0488 345/204 |
| 2007/0087774 A1* | 4/2007 | Richardson | H04M 1/72552 455/550.1 |
| 2007/0106950 A1* | 5/2007 | Hutchinson | G09B 5/067 715/761 |
| 2007/0165248 A1 | 7/2007 | Utsunomiya et al. | |
| 2007/0236477 A1* | 10/2007 | Ryu | G06F 3/03547 345/173 |
| 2008/0086468 A1* | 4/2008 | Jing | G06F 17/3087 |
| 2008/0243792 A1* | 10/2008 | Fujinaga | G06F 17/30637 |
| 2009/0027419 A1* | 1/2009 | Kondo | G06T 3/40 345/649 |
| 2009/0103124 A1* | 4/2009 | Kimura et al. | 358/1.15 |
| 2009/0224999 A1* | 9/2009 | Kuwahara | A63F 13/00 345/1.3 |
| 2010/0097322 A1* | 4/2010 | Hu | G06F 3/04883 345/173 |
| 2010/0315359 A1* | 12/2010 | Seong | G06F 15/025 345/173 |
| 2011/0063322 A1* | 3/2011 | Takabayashi | H04N 1/00132 345/619 |
| 2011/0074716 A1* | 3/2011 | Ono | 345/173 |
| 2011/0242007 A1* | 10/2011 | Gray | G06F 3/0488 345/173 |
| 2012/0072847 A1* | 3/2012 | Lee | G06F 3/0483 715/738 |
| 2012/0236026 A1* | 9/2012 | Hinckley et al. | 345/629 |
| 2012/0242689 A1* | 9/2012 | Miyata | G06F 3/14 345/629 |
| 2013/0169563 A1* | 7/2013 | Sotoike | G06F 3/0488 345/173 |
| 2013/0215044 A1* | 8/2013 | Ahn et al. | 345/173 |
| 2013/0222666 A1* | 8/2013 | Rydenhag | H04N 5/23293 348/333.02 |
| 2013/0230251 A1* | 9/2013 | Kondo | G06K 9/00523 382/190 |
| 2013/0283144 A1* | 10/2013 | Roh | G06F 17/241 715/230 |
| 2013/0332856 A1* | 12/2013 | Sanders | G06F 3/0481 715/753 |
| 2014/0055474 A1* | 2/2014 | Otala et al. | 345/536 |
| 2014/0078179 A1* | 3/2014 | Mistry | 345/660 |

FOREIGN PATENT DOCUMENTS

| | | |
|---|---|---|
| JP | 2007213566 A | 8/2007 |
| JP | 2010-146506 A | 7/2010 |
| JP | 2011-076233 A | 4/2011 |
| JP | 2012-141869 A | 7/2012 |

OTHER PUBLICATIONS

Office Action issued in Japanese Appln. No. 2012-219603 mailed May 24, 2016.

\* cited by examiner

OPERATION RECEPTION DEVICE AND METHOD FOR RECEIVING OPERATION ON PAGE IMAGE, STORAGE MEDIUM, AND IMAGE FORMING APPARATUS FOR USE WITH OPERATION RECEPTION DEVICE

This application is a U.S. National Phase Application of PCT International Application PCT/JP2013/075212 filed on Sep. 11, 2013 which is based on and claims priority from JP 2012-219603 filed on Oct. 1, 2012 the contents of which is incorporated in its entirety by reference.

TECHNICAL FIELD

The present invention relates to operation reception device and method for receiving an operation on a page image or on page images, a storage medium storing a program for executing the operation reception method, and an image forming apparatus for use with the operation reception device.

BACKGROUND ART

In recent years, image forming apparatuses have been known that are capable of receiving not only an operation setting from an operation unit of the image forming apparatus, but also an operation setting from an external operation reception device such as a portable terminal. For example, there have been known image forming apparatuses that can detect a user's flick operation on a touch panel by a touch sensor or can simultaneously detect coordinates and loci of touch points of fingers by a multi-touch sensor. Such image forming apparatus can perform various operations according to a user's flick operation where a user's finger is swiftly moved on a touch panel or according to the number and loci of touch points, whereby the user's operability of the apparatus can be improved.

For example, a page information display device disclosed in PTL 1 enables the user to perform on an image a touch or flick operation that resembles a selecting or flipping operation on a physical medium (e.g. a sheet). It is therefore possible for the user to perform on a screen an intuitive image selection or flipping operation similar to an operation on a physical medium.

CITATION LIST

Patent Literature

{PTL 1} Japanese Laid-open Patent Publication No. 2001-265481

SUMMARY OF INVENTION

Technical Problem

However, a display device (such as a touch panel) of an operation reception device is usually disposed on an upper face of an apparatus to which the operation reception device is mounted, and a display device (such as a touch panel) of an external operation reception device is usually disposed on a front face of the external operation reception device. Thus, an operation resembling an operation of pinching a physical medium (sheet) between fingers is not assumed to be performed on an image displayed on the display device. In other words, conventional operation reception devices are each configured on the assumption that an operation resembling an operation of pinching a sheet or sheets between fingers never be performed on an image, and therefore cannot detect and receive such an operation.

The present invention provides an operation reception device and method that are capable of detecting and receiving an intuitive operation that resembles an operation of pinching a sheet or sheets between fingers, and provides a storage medium storing a program for executing the operation reception method and an image forming apparatus for use with the operation reception device.

Solution to Problem

Accordingly, there is provided an operation reception device including a display panel having a display screen, a first touch panel having a first touch sensor for detecting an operation on the display screen, and a display control unit for controlling display on the display screen, comprising a second touch panel provided on a face of the operation reception device opposite from a face on which the display panel and the first touch panel are provided, the second touch panel having a second touch sensor for detecting an operation on an outer face of the second touch panel, a determination unit configured to determine whether or not a coordinate position where the operation on the display screen is detected by the first touch sensor and a coordinate position where the operation on the outer face of the second touch panel is detected by the second touch sensor are same as each other, a designation unit configured, in a case where it is determined by the determination unit that the coordinate positions respectively detected by the first and second touch sensors are the same as each other, to receive designation of at least one page image, an operation reception unit configured to receive an editing operation on the at least one page image whose designation has been received by the designation unit, and an edition unit configured to perform predetermined editing corresponding to the editing operation received by the operation reception unit on the at least one page image whose designation has been received by the designation unit.

The features and advantages of the invention will become more apparent from the following detailed description taken in conjunction with the accompanying drawings.

Advantageous Effects of Invention

With this invention, in a case that coordinate positions where operations on the first and second touch panels provided on both faces of the operation reception device respectively detected by touch sensors of these touch panels are the same as each other, designation of at least one page image is received, an editing operation on the at least one page image is received, and predetermined editing corresponding to the editing operation is performed. When an intuitive operation (e.g. extraction operation) resembling an operation of pinching a sheet or sheets between fingers is performed, such operation can be detected and received and predetermined editing (e.g. extraction of the at least one page image) corresponding to the operation can be carried out.

DESCRIPTION OF EMBODIMENTS

The present invention will now be described in detail below with reference to the drawings showing a preferred embodiment thereof.

Figure 1:
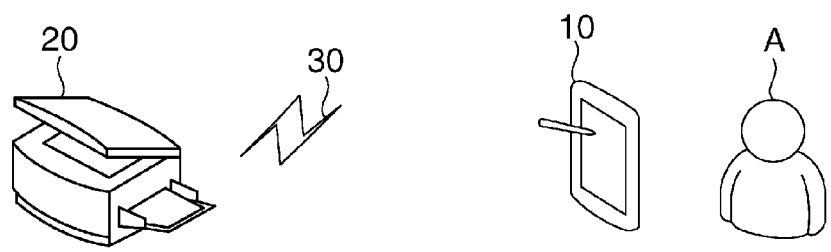
FIG. 1 A schematic view showing an example of connection between an operation reception device and an image forming apparatus in one embodiment of this invention.

FIG. 1 schematically shows an example of connection between an operation reception device and an image forming apparatus in one embodiment of this invention.

Referring to FIG. 1, an image forming apparatus 20 is a printer, facsimile apparatus, multi-function peripheral, or the like. An operation reception device 10 is configured to be detachably mounted to the image forming apparatus 20 and to be operable by a user (denoted by symbol A in FIG. 1), and is connected for communication with the image forming apparatus 20 via a wireless LAN 30 and used as an external operation unit.

The operation reception device 10 has functions to set a desired function of the image forming apparatus 20, to give an instruction to execute the desired function of the image forming apparatus 20, to receive an operation for preview display of e.g. image data handled by the image forming apparatus 20, and to receive a desired editing operation on the image data. For example, the operation reception device 10 is capable of receiving image data from the image forming apparatus 20 via the wireless LAN 30 for preview display of the same, and capable of receiving an editing operation on the preview-displayed image data.

It should be noted that the operation reception device 10 may be a device (e.g., a smart phone or other portable terminal) that has a function of operating the image forming apparatus 20. The operation reception device 10 can be connected for communication with the image forming apparatus 20 by wired-connection, instead of connecting it with the image forming apparatus 20 via the wireless LAN 30.

Figure 2:
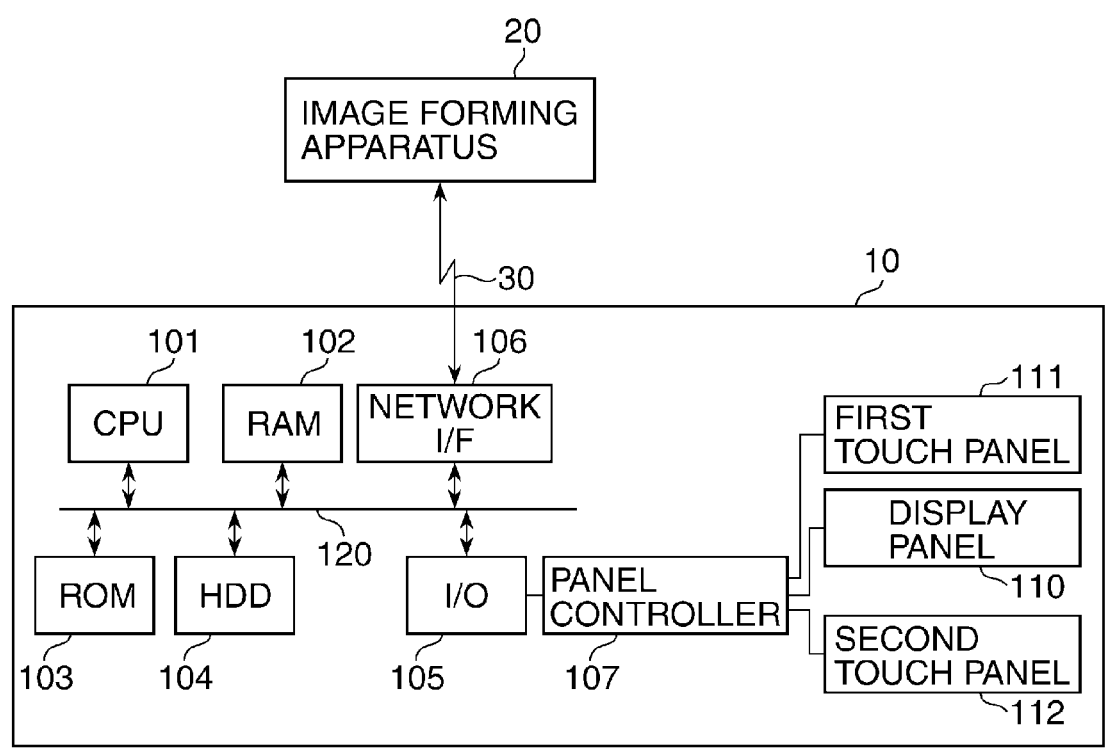
FIG. 2 A block diagram showing an internal structure of the operation reception device.

FIG. 2 shows an internal structure of the operation reception device 10 in block diagram.

The operation reception device 10 includes a CPU 101, RAM 102, ROM 103, HDD 104, I/O 105, and network I/F 106, which are connected to a system bus 120. The I/O 105 is connected with a panel controller 107 to which a display panel (a liquid crystal display in this embodiment) 110 and first and second touch panels 111, 112 are connected.

The CPU 101 reads programs such as an OS (operating system) and application software from the HDD 104 and executes them to perform various control. The RAM 102 is a system work memory for use by the CPU 101 to execute programs. The ROM 103 stores a BIOS (basic input output system), a program for starting the OS, and configuration files. The HDD 104 is a hard disk drive and stores system software, etc. It should be noted that instead of using the HDD 104, it is possible to use a non-hard disk type memory from and into which data can be read and written.

The network I/F 106 is connected with the wireless LAN 30 and performs data communication with an external apparatus such as the image forming apparatus 20 in any suitable communication method.

The I/O 105 is an input/output interface and outputs image data and various information to the display panel 110 via the panel controller 107. The I/O 105 outputs operation setting information and instruction information, which are input through the first and second touch panels 111, 112, to the CPU 101 via the panel controller 107.

Figure 8A:
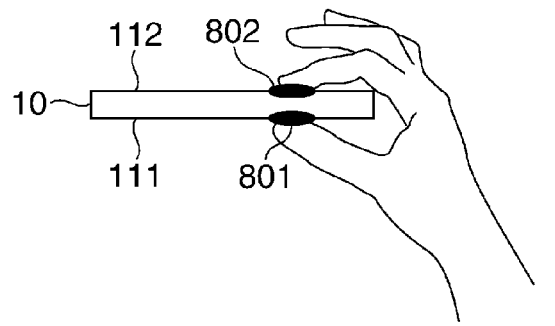
FIG. 8A A side view showing how the operation reception device is operated.
Figure 8B:
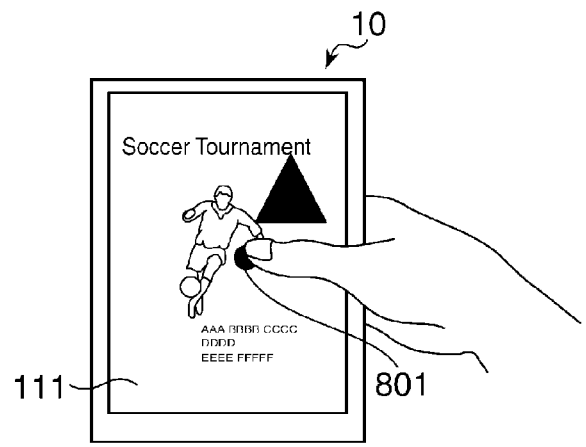
FIG. 8B A front view showing how the operation reception device is operated.

The liquid crystal display 110 and the first touch panel 111 are disposed on one flat portion (a front face in this embodiment) of the operation reception device 10 that is formed into a flat plate shape as shown in FIGS. 8A and 8B. The first touch panel 111 is affixed to the liquid crystal display 110. The liquid crystal display 110 has a display screen on which image data, etc. can be displayed with a predetermined resolution and a predetermined number of colors. For example, a GUI (graphical user interface) screen is displayed on the display screen of the liquid crystal display 110, and various windows and data required for operation are also displayed thereon.

The first touch panel 111 has a capacitive touch sensor capable of multi-touch detection (hereinafter, referred to as the first touch sensor). The first touch sensor can detect an operation performed on the display screen of the liquid crystal display 110. The second touch panel 112 has a touch sensor capable of multi-touch detection (hereinafter, referred to as the second touch sensor). The second touch sensor is disposed on another flat portion (a back face in this embodiment) of the operation reception device 10 and can detect operation performed on outer face of the second touch panel 112.

The operation reception device 10 is configured to detect a touch operation by the first and second touch sensors and receive the touch operation. For example, it is possible to receive an editing operation such as deletion, move, copy, or insertion of apart or all of images of a document of plural pages.

Next, a description will be given of how the operation reception device 10 is operated with reference to FIGS. 8A and 8B.

The user can operate the operation reception device 10 while holding it between fingers as shown in FIG. 8A. For example, as shown in FIGS. 8A and 8B, the user can touch the front face of the operation reception device 10 with the thumb and can touch the back face thereof with the forefinger, thereby capable of operating the operation reception device 10 with a feeling to pinch the device 10 with fingers.

In the case of FIGS. 8A and 8B, the touch sensor of the first touch panel 111 detects a touch point 801 on the front face of the operation reception device 10, and the touch sensor of the second touch panel 112 detects a touch point 802 on the back face of the operation reception device 10. As will be described later, when the touch points 801, 802 have the same coordinate position as each other, it is determined that a double-sided touch is performed.

Figure 3:
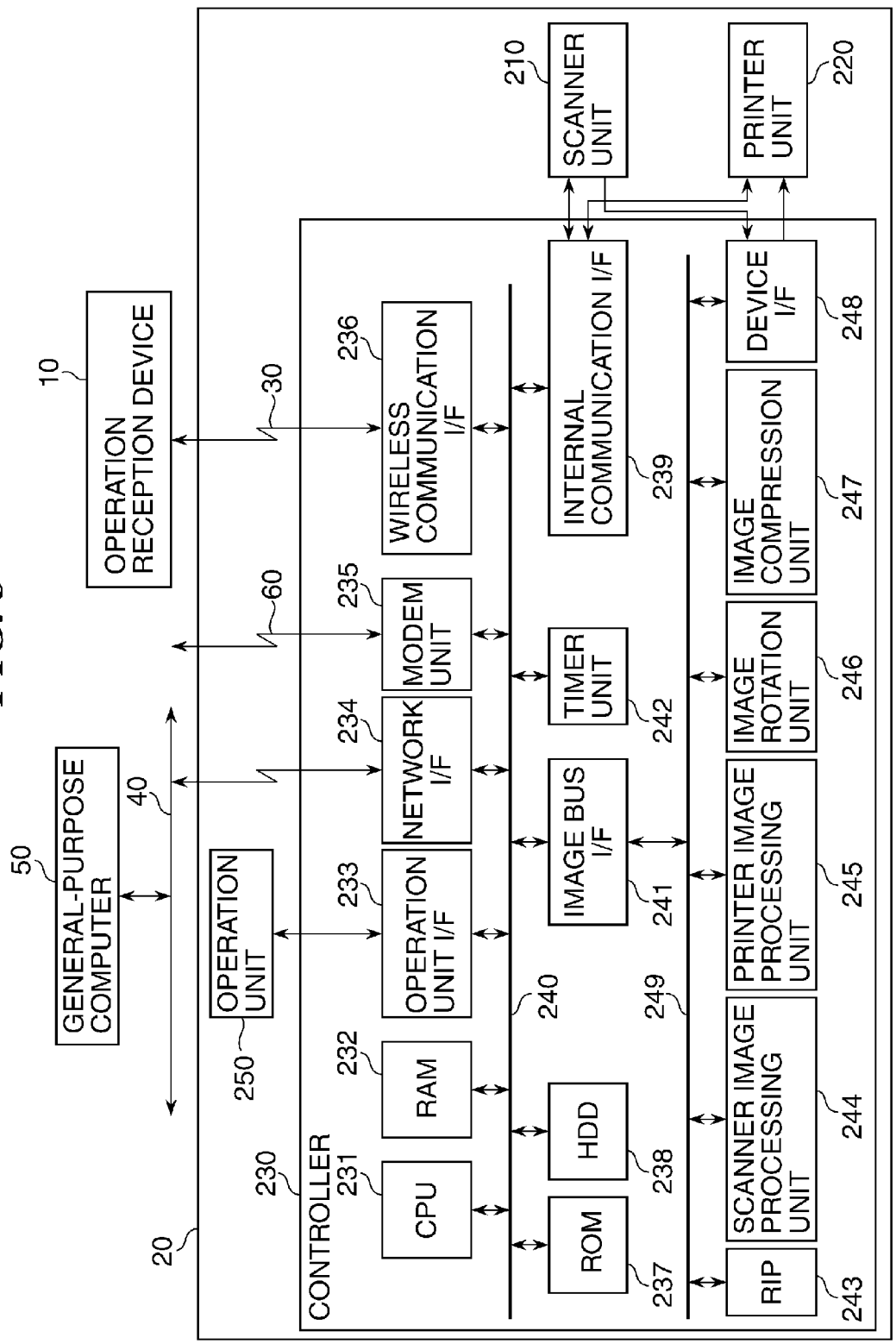
FIG. 3 A block diagram showing an internal structure of the image forming apparatus.

FIG. 3 shows an internal structure of the image forming apparatus 20 in block diagram.

The image forming apparatus 20 includes a controller 230, an operation unit 250 operable by the user to operate the image forming apparatus 20, a scanner unit 210 that reads an image of an original and obtains image data under the control of the controller 230 in response to a user's instruction given through the operation unit 250, and a printer unit 220 that prints image data on a sheet under the control of the controller 230.

The scanner unit 210 includes a CPU (not shown) for controlling respective parts of the scanner unit 210, and includes e.g. an illumination lamp and scan mirrors (none of which are shown) for reading an original. The printer unit 220 includes a CPU (not shown) for controlling respective parts of the printer unit 220, and includes e.g. a photosensitive drum and a fixing device (none of which are shown) for image formation and image fixing.

The controller 230 is connected with the scanner unit 210, printer unit 220, wired LAN 40, public line (WAN) 60, and wireless LAN 30. A general-purpose computer 50 is connected to the wired LAN 40.

The controller 230 has a CPU 231 for centrally controlling the image forming apparatus 20. A RAM 232 is a system work memory used by the CPU 231 for its operation, and also serves as an image memory for temporarily storing image data. An operation unit I/F 233, which is an interface (I/F) with the operation unit 250, outputs to the operation unit 250 image data for being displayed on the operation unit 250 and notifies the CPU 231 of information input by the user through the operation unit 250.

A network I/F 234 is connected to the wired LAN 40 and performs data communication with the general-purpose computer 50 and with apparatuses on the wired LAN 40. A modem unit 235 is connected to the public line 60 and transmits and receives data to and from an external facsimile apparatus (not shown). A wireless communication I/F 236 is connected through the wireless LAN 30 to the external operation reception device 10.

A ROM 237 is stored with a boot program for execution by the CPU 231. A hard disk drive (HDD) 238 is stored with system software, image data, software counter value, etc. The controller 230 causes the HDD 238 or the RAM 232 to store e.g. output attribute information (such as user name, number of copies of print, color printing) for execution of a print job or a copy job in the form of a job log, and manages the output attribute information.

An internal communication I/F 239 communicates with the scanner unit 210 and the printer unit 220. An image bus I/F 241 is a bus bridge through which a system bus 240 and an image bus 249 are connected to each other and by which data structure is converted. A timer unit 242 detects time. The system bus 240 is connected with the elements 231 to 238, 241, and 242 of the controller 230.

The controller 230 also includes a raster image processor (RIP) 243 that develops a PDL code contained in a print job received from the general-purpose computer 50 via the wired LAN 40 into a bitmap image. A scanner image processing unit 244 performs correction, modification, and editing on image data input form the scanner unit 210. A printer image processing unit 245 performs correction, resolution conversion, etc. on image data to be output from (to be printed by) the printer unit 220. An image rotation unit 246 performs rotation of image data. An image compression unit 247 performs e.g. JPEG compression/decompression processing on multi-valued image data and performs e.g. JBIG, MMR, or MH compression/decompression processing on binary image data. A device I/F 248 connects the scanner unit 210 and the printer unit 220 to the controller 230 and performs synchronous/asynchronous conversion of image data. The image bus 249 is connected with the elements 241 and 243 to 248 of the controller 230, and transfers image data at high speed therethrough.

It should be noted that the operation unit 250 of the image forming apparatus 20 can be configured to achieve functions similar to those of the operation reception device 10, while utilizing hardware resources of the controller 230.

Figure 4:
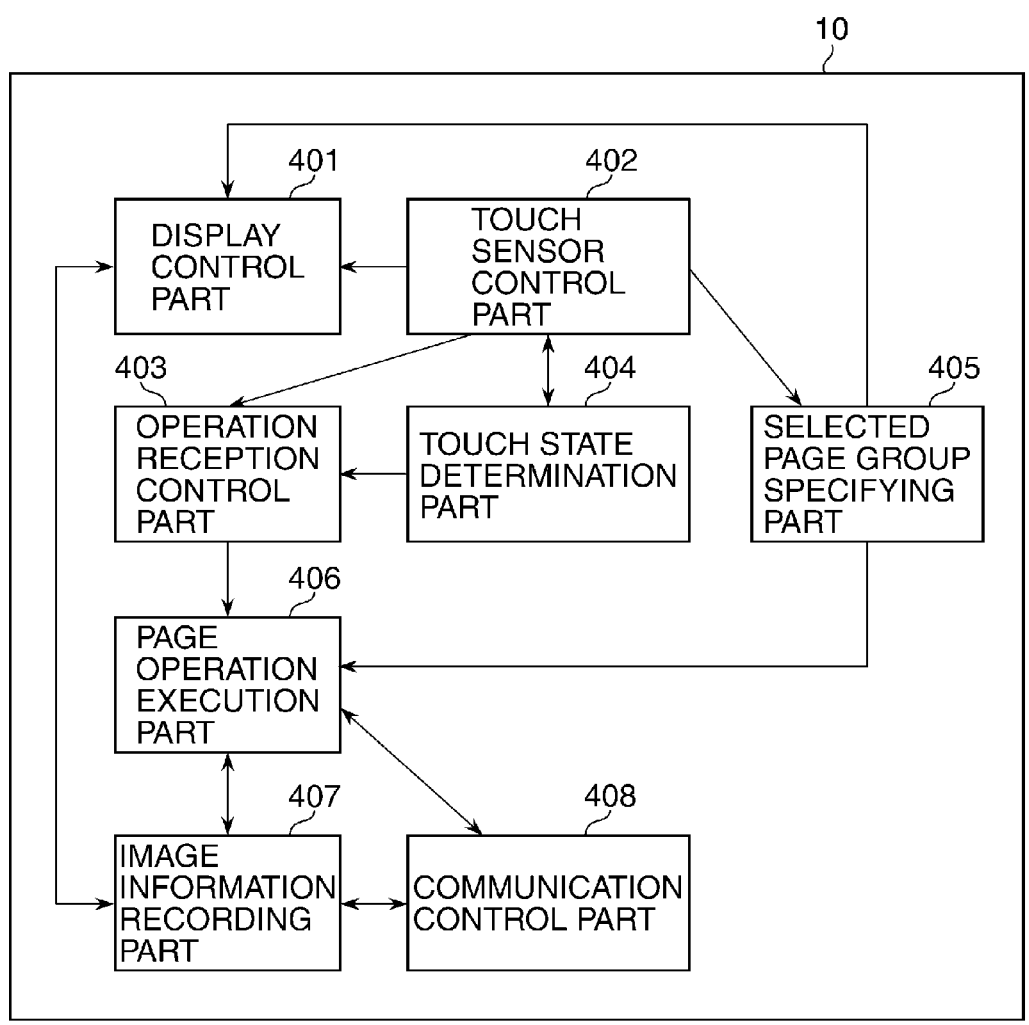
FIG. 4 A view showing an example of software structure of the operation reception device for executing an operation reception process.

FIG. 4 shows an example of software structure of the operation reception device 10 for executing an operation reception process.

As shown in FIG. 4, the operation reception device 10 includes a display control part 401, touch sensor control part 402, operation reception control part 403, touch state determination part 404, selected page group specifying part 405, page operation execution part 406, image information recording part 407, and communication control part 408, which are software modules running on the CPU 101 of the operation reception device 10. Functions of these software modules 401 to 408 are realized by the CPU 101 by executing an operation reception program, which is read from the HDD 104 and loaded to the RAM 102.

The display control part 401 has a function of controlling display on the liquid crystal display 110. The touch sensor control part 402 has a function of controlling the first and second touch panels 111, 112 (first and second touch sensors) by using the panel controller 107 shown in FIG. 2, and notifies detection results of coordinate positions and loci of touch points by the touch sensors of the touch panels 111, 112 to the display control part 401, operation reception control part 403, touch state determination part 404, and selected page group specifying part 405.

The touch state determination part 404 has a function of determining which one of a single-sided touch and a double-sided touch is performed based on detection results by the touch sensors notified from the touch sensor control part 402. The operation reception control part 403 has a function of generating operation reception information that represents the coordinate positions and loci of the touch points based on detection results by the touch sensors notified from the touch sensor control part 402 and a determination result notified from the touch state determination part 404, thereby specifying a type of editing operation. The selected page group specifying part 405 has a function of generating information that specifies at least one page image in plural page images (selected page group information that specifies a selected page group in this embodiment) based on detection results by the touch sensors notified from the touch sensor control part 402 and a determination result notified from the touch state determination part 404.

The display control part 401 has a function of controlling display on the liquid crystal display 110, as previously described. More specifically, the display control part 401 controls display on the display screen of the liquid crystal display 110 based on detection results by the touch sensors notified from the touch sensor control part 402, selected page group information given from the selected page group specifying part 405, and image information given from the image information recording part 407.

The touch state determination part 404 has a function of determining which one of a single-sided touch and a double-sided touch is performed, as previously described. The term "single-sided touch" refers to a touch to the first touch panel 111, and the term "double-sided touch" refers to touches to both the first and second touch panels 111, 112. Whether or not a double-sided touch is performed is determined by determining whether or not a coordinate position of the touch point 801 and a coordinate position of the touch point 802 are the same as each other. If it is determined that a double-sided touch is performed, the touch state determination part 404 notifies the selected page group specifying part 405 of the determination result to that effect. On the other hand, if determined that a single-sided touch is performed, the touch state determination part 404 notifies the operation reception control part 403 of the determination result to that effect.

The operation reception control part 403 has a function of generating operation reception information to specify a type of editing operation, as previously described. The operation reception information is notified to the page operation execution part 406. The editing operation is a delete operation, copy operation, extract operation, insert operation, or the like.

The selected page group specifying part 405 has a function of generating selected page group information, as previously described. For example, based on the determination result of the touch state determination part 404, the selected page group specifying part 405 notifies the display control part 401 of an instruction to cause the liquid crystal display 110 to display a selected page specifying screen 900 shown in FIG. 9 for specifying a selected page group. The selected page group specifying part 405 notifies the page operation execution part 406 of information that represents start and end pages as the selected page group information.

The page operation execution part 406 has a function of performing, based on operation reception information notified from the operation reception control part 403, selected page group information notified from the selected page group specifying part 405, and image information notified from the image information recording part 407, an editing operation on the selected page group in the image represented by the image information. The page operation execution part 406 also has a function of performing predetermined editing that corresponds to the editing operation and has a function of notifying a command for causing the image forming apparatus 20 to execute the predetermined editing to the image forming apparatus 20 via the communication control part 408.

The image information recording part 407 has a function of recording and managing image information (image data stored in the RAM 102) and has a function of transmitting and receiving image information to and from the page operation execution part 406 and to and from the image forming apparatus 20 via the communication control part 408 to thereby record and manage image information relating to images having undergone the editing operation.

The communication control part 408 has a function of notifying the image forming apparatus 20 of a command notified from the page operation execution part 406, a function of notifying the image information recording part 407 of image information received from the image forming apparatus 20, and a function of transmitting image information read from the image information recording part 407 to the image forming apparatus 20.

When an image of plural pages is displayed on the liquid crystal display 110 based on e.g. image data read by the scanner unit 210 of the image forming apparatus 20 or image data received via FAX, an editing operation such as deleting one or more unnecessary pages or extracting or inserting one or more pages is sometimes requested. In the following, with reference to FIG. 5, a description will be given of an operation reception process performed when the operation reception device 10 receives an editing operation.

Figure 5:
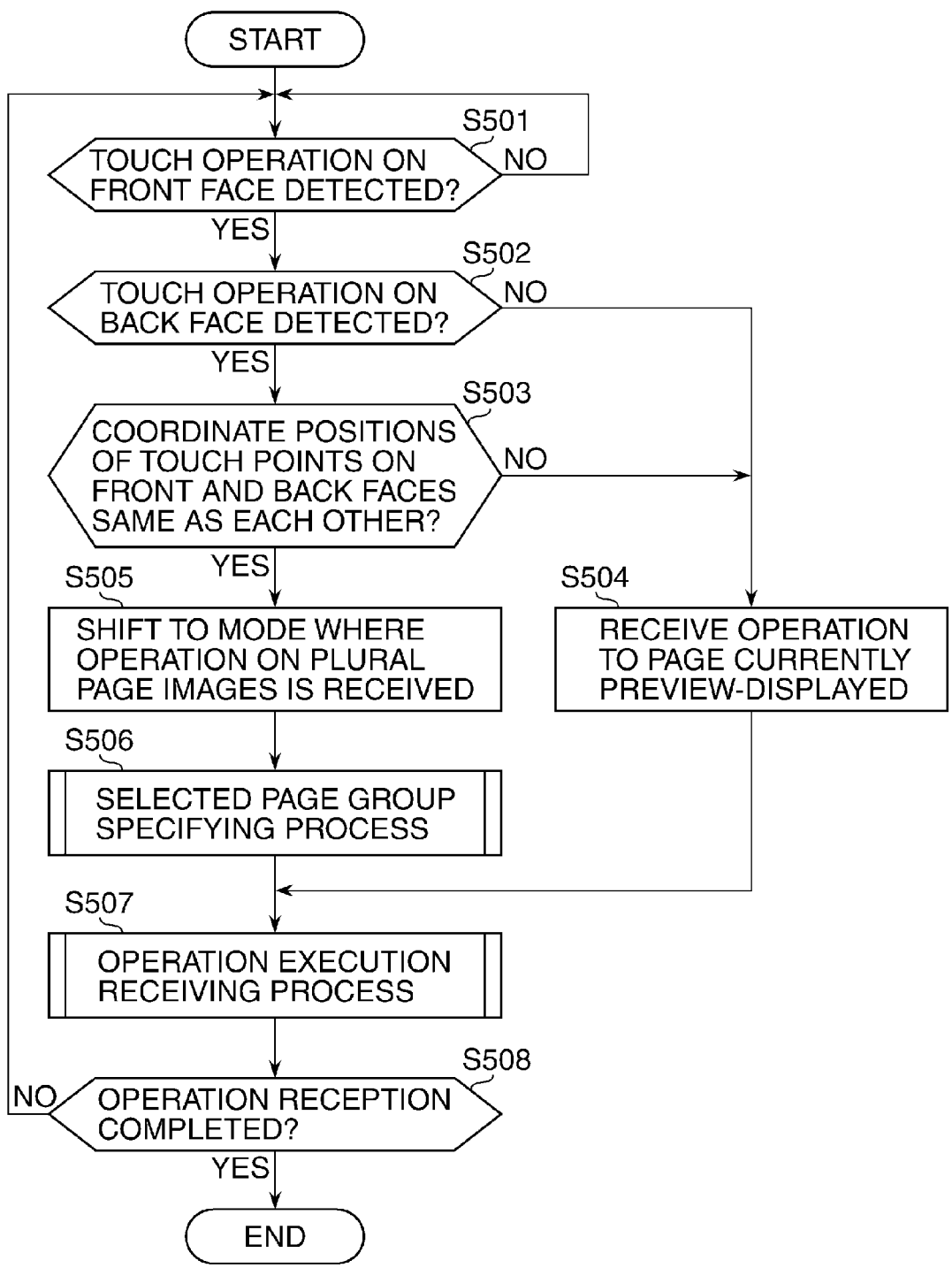
FIG. 5 A flowchart showing the flow of the operation reception process performed by the operation reception device.

FIG. 5 shows in flowchart the flow of the operation reception process performed by the operation reception device 10. This process is performed by the CPU 101 by executing an operation reception program read from the HDD 104 to the RAM 102.

It is assumed here that one of plural page images received from the image forming apparatus 20 is full-screen displayed on the liquid crystal display 110 in a state that page turning can be made by a flick operation.

The operation reception process of FIG. 5 starts in a state where the page images are turned to a desired page image by the user. The CPU 101 (more specifically, the touch sensor control part 402 and the touch state determination part 404 running on the CPU 101) determines whether or not a touch operation is detected by the touch sensor of the first touch panel 111 on the front face of the operation reception device 10 (step S501). If the answer to step S501 is NO, the process returns to step S501.

If determined in step S501 that a touch operation to the front face of the operation reception device 10 is detected, the CPU 101 determines whether or not a touch operation is detected by the touch sensor of the second touch panel 112 on the back face of the operation reception device 10 (step S502). If determined in step S502 that a touch operation to the back face is detected, the CPU 101 (touch state determination part 404) determines whether or not a coordinate position of a touch point 801 on the front face of the operation reception device 10 and a coordinate position of a touch point 802 on the back face thereof are the same as each other (step S503).

If determined in step S503 that the coordinate positions of the touch points 801, 802 are the same as each other, the process proceeds to step S505, determining that a user's pinching operation is performed. On the other hand, if determined that the coordinate positions are not the same as each other, the process proceeds to step S504.

In step S504, the CPU 101 (operation reception control part 403) receives an operation to the page that is currently preview-displayed. Then, the process proceeds to step S507.

In step S505, the CPU 101 shifts to a mode where it receives an operation on plural page images. Next, the CPU 101 performs a process for specifying a selected page group (step S506). This selected page group specifying process will be described in detail later.

In step S507, the CPU 101 (operation reception control part 403 and page operation execution part 406) executes an operation execution receiving process in response to an operation received in step S504 or in S506. This operation execution receiving process will be described in detail later.

Next, the CPU 101 determines whether or not an instruction for final processing on image data as an object of operation reception (e.g., printing instruction to the image forming apparatus 20, instruction for recording into the hard disk, or instruction for transmission to an external apparatus) is given, thereby determining whether or not operation reception is completed (step S508). If determined that the operation reception is not completed, the process returns to step S501. On the other hand, if determined that the operation reception is completed, the present process is completed.

In the following, with reference to FIGS. 6 and 9, a description will be given of the selected page group specifying process performed in step S506 of FIG. 5.

Figure 6:
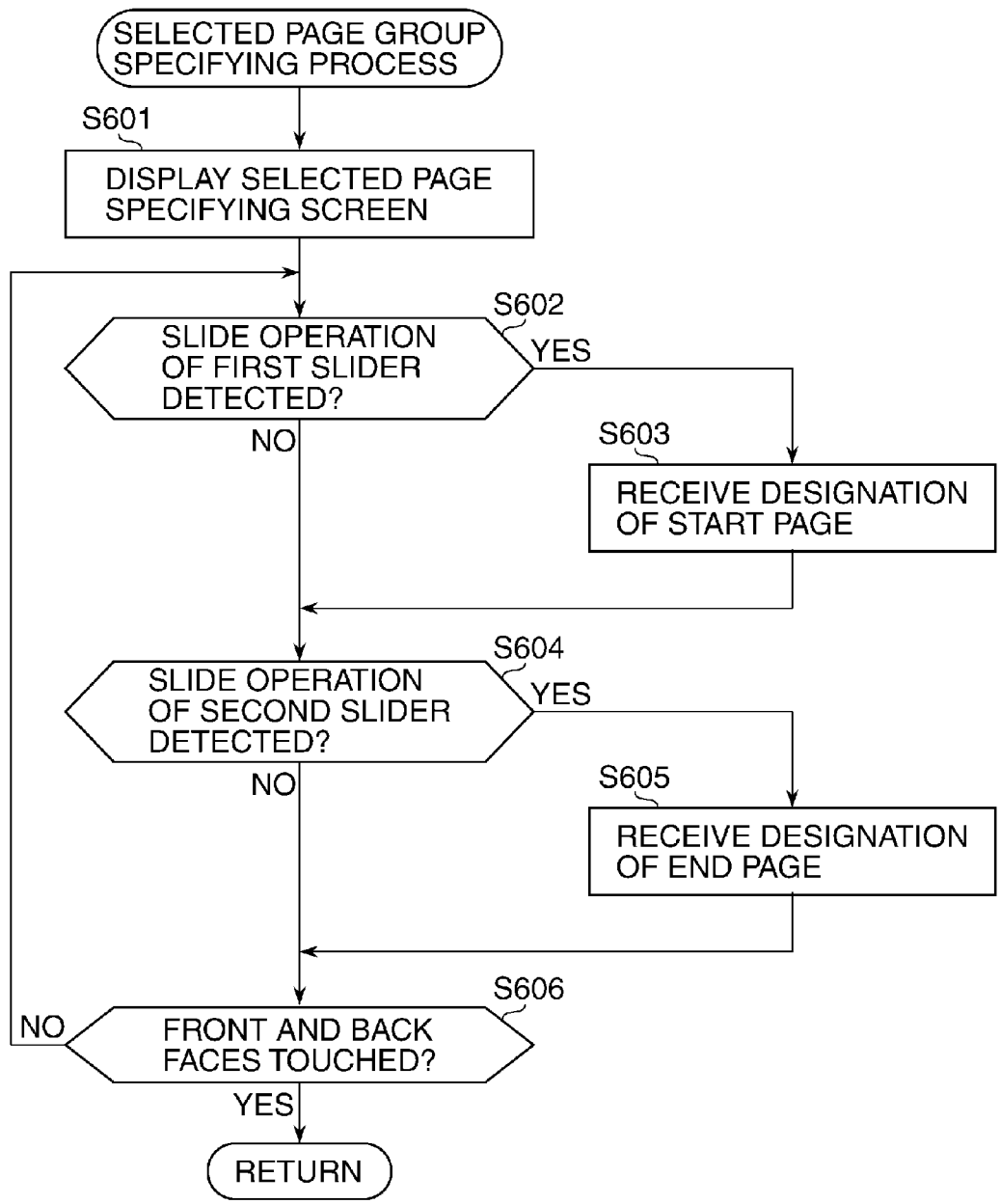
FIG. 6 A flowchart showing in detail a selected page group specifying process executed in step S506 of the operation reception process.
Figure 9:
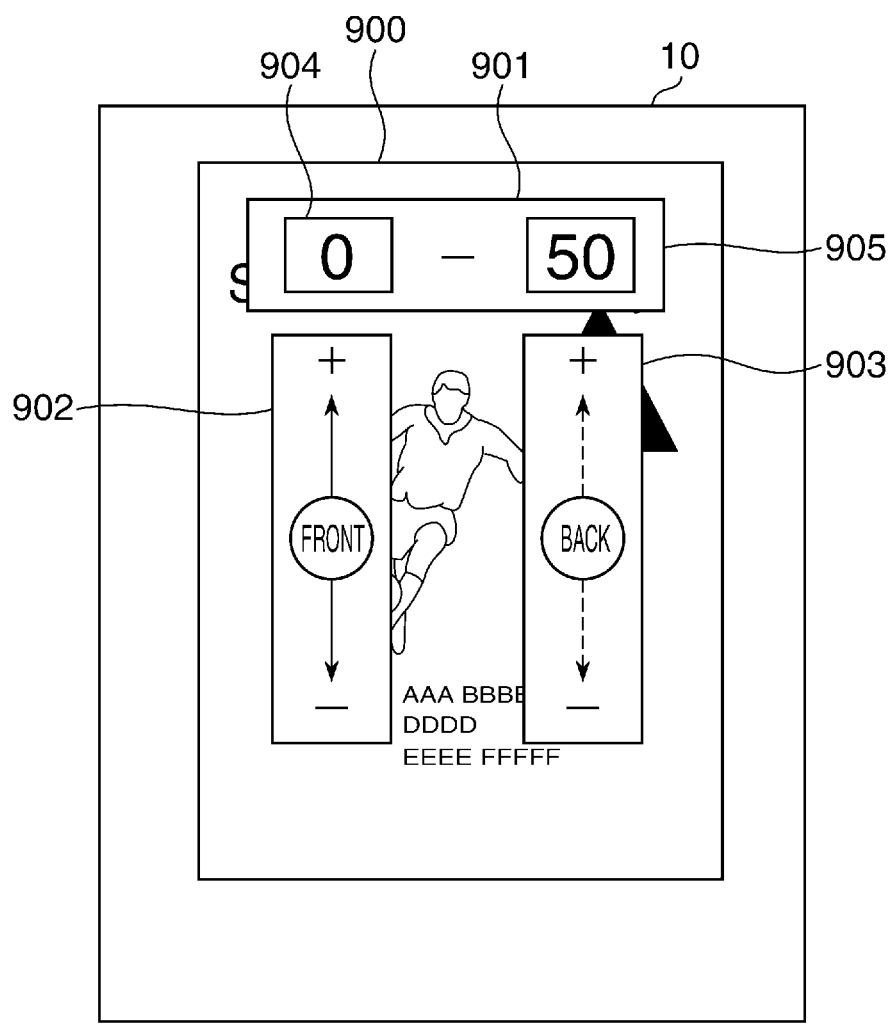
FIG. 9 A view showing a selected page specifying screen for use in specifying a selected page group in the selected page group specifying process of FIG. 6.

FIG. 6 shows the procedures of the selected page group specifying process in flowchart, and FIG. 9 shows a selected page specifying screen for specifying a selected page group.

In the selected page group specifying process of FIG. 6, the CPU 101 (display control part 401) causes the liquid crystal display 110 to display the selected page specifying screen 900 shown in FIG. 9 (step S601). On the selected page specifying screen 900, a selected page display field 901 having a start page display field 904 and an end page display field 905 is displayed and selected page change sliders 902, 903 (hereinafter, sometimes referred to as the first and second sliders) are displayed.

The user can change values of selected pages displayed in the start and end page display fields 904, 905 by sliding the selected page change sliders 902, 903. More specifically, each of the values of selected pages increases when the corresponding slider is slid to the direction of plus (+) sign, whereas each value decreases when the corresponding slider is slid to the direction of minus (−) sign. It should be noted that the start and end pages can be set to have the same value.

It should be noted that in the example shown in FIG. 9, both the selected page change sliders 902, 903 are disposed on the side of the first touch panel 111 of the operation reception device 10, but this is not limitative. For example, in a modification (not shown), the first slider 902 is disposed on the side of the first touch panel 111, and the second slider 903 is disposed on the side of the second touch panel 112 of the operation reception device 10.

Next, the CPU 101 determines whether or not a slide operation of the first slider 902 is detected by the touch sensor of the first touch panel 111 (step S602). If the answer to step S602 is NO, the process proceeds to step S604. On the other hand, if a slide operation of the first slider 902 is detected by the touch sensor of the first touch panel 111, the CPU 101 receives designation of the start page based on a result of the detection (step S603).

Next, the CPU 101 determines whether or not a slide operation of the second slider 903 is detected by the touch sensor of the first or second touch panel 111 or 112 (step S604). It should be noted that a slide operation of the second slider 903 is detected by the touch sensor of the first touch panel 111 in the example shown in FIG. 9, whereas it is detected by the touch sensor of the second touch panel 112 in the modification (not shown). If the answer to step S604 is NO, the process proceeds to step S606. On the other hand, if a slide operation of the second slider 903 is detected by the touch sensor of the first or second touch panel 111 or 112, the CPU 101 receives designation of the end page based on a result of the detection (step S605).

Next, the CPU 101 determines whether or not touch operations are substantially simultaneously detected by the touch sensors of the first and second touch panels 111, 112, thereby determining whether or not both the front and back faces of the operation reception device 10 are touched (step S606). If the answer to step S606 is NO, the process returns to step S602. On the other hand, if determined that both the front and back faces are touched (YES to step S606), the present process returns to the operation reception process of FIG. 5 and proceeds to step S507.

In the following, with reference to FIGS. 7 and 8C, a description will be given of the operation execution receiving process performed in step S507 of FIG. 5.

Figure 7:
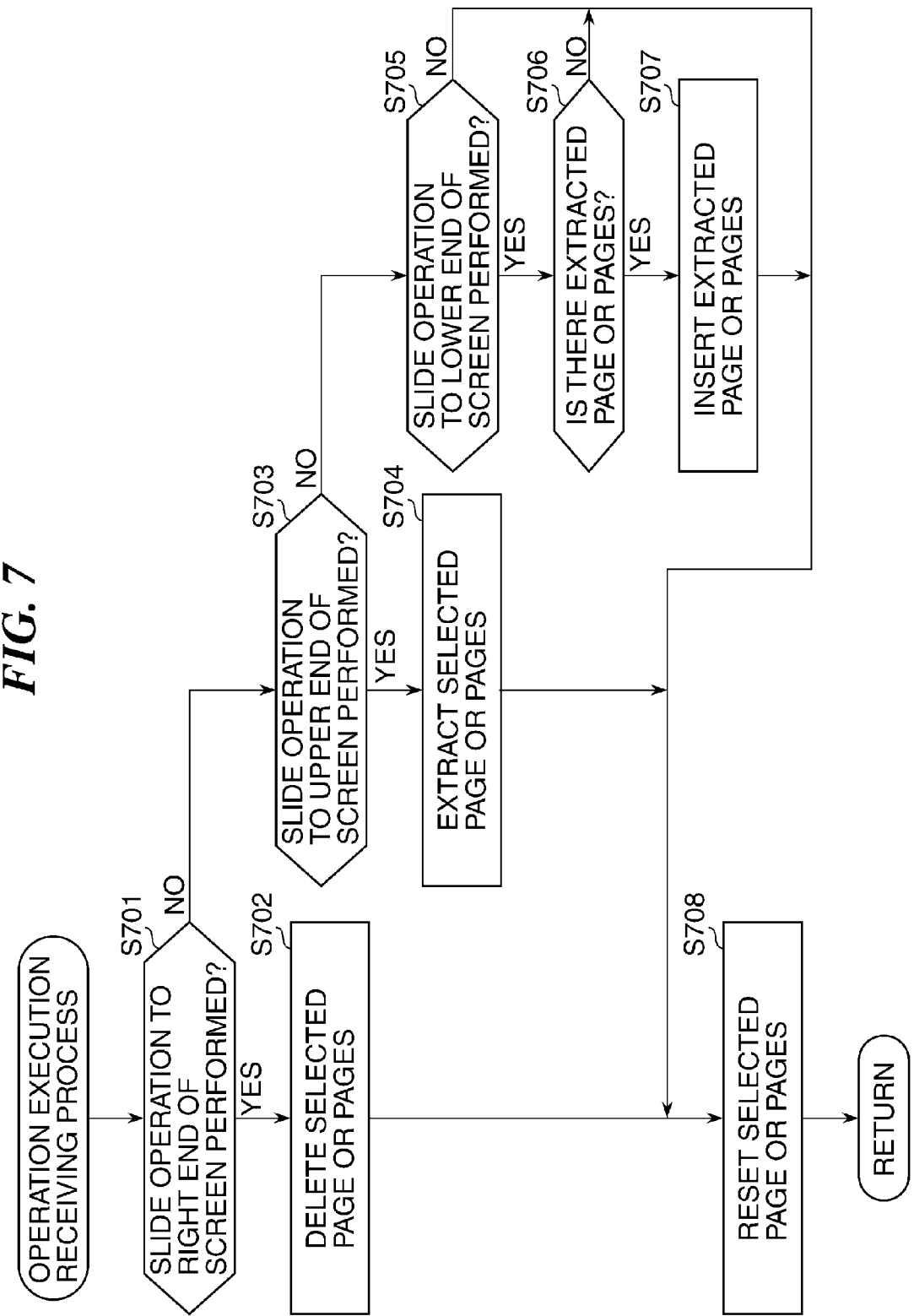
FIG. 7 A flowchart showing in detail an operation execution receiving process executed in step S507 of the operation reception process.
Figure 8C:
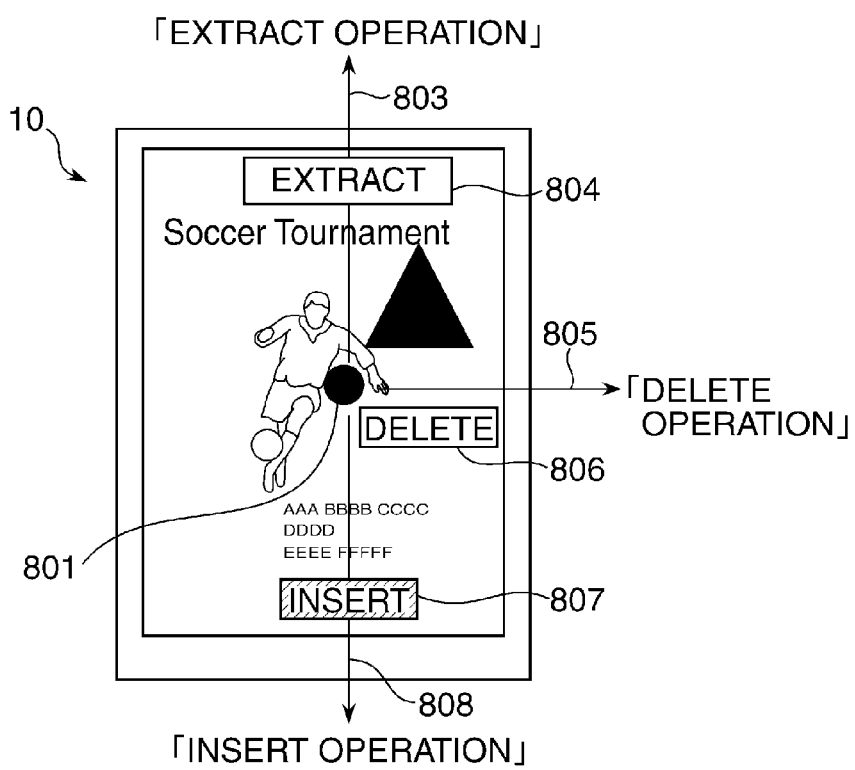
FIG. 8C A view showing editing operations performed on the operation reception device.

FIG. 7 shows the procedures of the operation execution receiving process in flowchart, and FIG. 8C shows editing operations performed on the operation reception device 10.

The operation execution receiving process of FIG. 7 is performed when the operation reception process of FIG. 5 proceeds from either step S504 or S506 to step S507.

When the process of FIG. 5 proceeds from step S504 to step S507, an editing operation on a page received in step S504 and currently displayed on the liquid crystal display 110 (hereinafter, referred to as the selected page) is received in the process of FIG. 7. Then, editing corresponding to the received editing operation is performed.

On the other hand, when the process of FIG. 5 proceeds from step S506 to step S507, an editing operation on a selected page group specified in step S506 (i.e., page images from the start page to the end page that are set on the selected page specifying screen 900 in the selected page group specifying process of FIG. 6, which will be referred to as the selected pages) is received in the process of FIG. 7. Then, editing corresponding to the editing operation is performed.

Although the selected page or pages differ between the above-described two cases, the same processing is performed in either case in the process of FIG. 7 as will be described below.

The CPU 101 first determines whether or not a slide operation to the right end of the screen has been performed on the screen based on a detection result of the touch sensor of the first touch panel 111 or based on detection results of the touch sensors of the first and second touch panels 111, 112 (step S701). More specifically, the determination in step S701 is performed based on detection results of the touch sensors of the first and second touch panels 111, 112 after a double-sided touch being detected in step S503 when the process of FIG. 5 proceeds from step S506 to step S507, whereas the determination is performed based on a detection result of the touch sensor of the first touch panel 111 after a front face touch being detected (i.e., after a double-sided touch not being detected), when the process of FIG. 5 proceeds from step S504 to step S507.

If determined in step S701 that a slide operation to the right end of the screen has been performed, the CPU 101 receives a delete operation determining that the delete operation has been performed, and deletes the selected page or pages in response to the delete operation (step S702), whereupon the process proceeds to step S708. As previously described, the selected page or pages are one or more page images corresponding to pages from start page to end page set on the selected page specifying screen 900 or are a page image currently preview-displayed and selected.

If determined in step S701 that a slide operation to the right end of the screen has not been performed, the CPU 101 determines whether or not a slide operation to an upper end of the screen has been performed based on a detection result or detection results by one or both of the touch sensors (step S703). If the answer to step S703 is YES, the CPU 101 receives an extract operation determining that the extract operation has been performed, and extracts the selected page or pages in response to the extract operation (step S704), whereupon the process proceeds to step S708. Image data of the selected page or pages extracted in step S704 is temporarily stored in the RAM 102 or in the HDD 104.

If determined that a slide operation to the upper end of the screen has not been performed (NO to step S703), the CPU 101 determines whether or not a slide operation to the lower end of the screen has been performed on the screen (step S705). If the answer to step S705 is YES, the CPU 101 determines that an insert operation has been performed and then determines whether or not there is an extracted page or pages in the RAM 102 or in the HDD 104 (step S706). If determined that there is an extracted page or pages (YES to step S706), the CPU 101 receives an insert operation and inserts the extracted page or pages e.g. before the page currently displayed on the liquid crystal display 110 in response to the insert operation (step S707), whereupon the process proceeds to step S708. It should be noted that after the extraction of the selected page or pages in step S704, a place where the extracted page or pages are to be inserted can be changed by the user by changing the page currently displayed by a page-turn operation (flick operation).

The CPU 101 resets the selected page or pages (step S708) when an editing operation on selected page has been received and predetermined editing corresponding to the editing operation has been completed, i.e., after the selected page or pages are deleted in step S702 or extracted in step S704 or the extracted page or pages are inserted in step S707. Then, the process returns to the operation reception process of FIG. 5 and proceeds to step S508.

In this embodiment, the user can perform an editing operation on the operation reception device 10 by sliding a finger or fingers upward, downward, or rightward from the touch point 801 or from touch points 801, 802 on the operation reception device 10, as shown in FIG. 8C.

To clearly indicate types of editing operations to the user, the types of operations are displayed on the display screen of the liquid crystal display 110 each of which can be performed by sliding a finger or fingers in a predetermined direction e.g. in an upward, downward or rightward direction from the touch point 801 or from the touch points 801, 802. In the illustrated example, an extract indication 804 representing that an extract operation can be performed by an upward slide operation is displayed on an upper part of the screen, a delete indication 806 representing that a delete operation can be performed by a rightward slide operation is displayed on a right side part of the screen, and an insert indication 807 representing that an insert operation can be performed by a downward slide operation is displayed on a lower part of the screen.

The indication for an operation switched to usable or unusable depending on any conditions can be grayed out when it is not usable. In the illustrated example, the insert indication 807 is grayed out.

As described above, when a slide operation from the touch point 801 or from the touch points 801, 802 to the upper end of the screen (denoted by reference numeral 803 in FIG. 8C) is performed on the screen, the operation reception device 10 determines that the extract operation is performed. When a slide operation from the touch point 801 or from the touch points 801, 802 to the right end of the screen (denoted by reference numeral 805 in FIG. 8C) is performed on the screen, the operation reception device 10 determines that the delete operation is performed. When a slide operation from the touch point 801 or from the touch points 801, 802 to the lower end of the screen (denoted by reference numeral 808 in FIG. 8C) is performed on the screen, the operation reception device 10 determines that the insert operation is performed.

It should be noted that the touch operation, slide operation, and editing operation corresponding to slide operation are not limited to the above-described ones. For example, the touch operation may not be a double-sided touch, but may be a single-sided touch on the front or back face of the operation reception device 10. Instead of detecting the slide operation to the upper end, lower end, or right end of the screen, various slide operations can be detected according to slide length of the slide operation on the screen.

Although a case where the upward, downward, and rightward slide operations are performed on the screen has been described in this embodiment on the assumption of right-hand operation, the directions of slide operations are not limited thereto. It is possible to execute slide operations in various directions including the leftward direction taking into account the case of left-hand operation.

The editing operations corresponding to slide operations are not limited to the extract operation, delete operation, and insert operation, but may be a copy operation, print operation, rotary operation, etc.

According to the above-described embodiment, if it is determined that coordinate positions of operations on the operation reception device 10 detected by the touch sensors of the first and second touch panels 111, 112 are the same as each other, designation of start and end pages in plural pages is received on the first touch panel 111, an editing operation on pages whose designation has been received is received, and predetermined editing such as deletion or extraction corresponding to the editing operation is performed. It is therefore possible to detect an intuitive editing operation (e.g., delete operation or extract operation) on at least one page image resembling an operation of pinching a sheet or sheets between fingers and also possible to execute predetermined editing (such as deletion or extraction) corresponding to the editing operation.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

REFERENCE SIGNS LIST

10 Operation reception device
20 Image forming apparatus
401 Display control part
402 Touch sensor control part
403 Operation reception control part
404 Touch state determination part
405 Selected page group specifying part
110 Display panel
111 First touch panel
112 Second touch panel

The invention claimed is:
1. An operation reception device including a display panel having a display screen, and a first touch panel having a first touch sensor for detecting an operation on the display screen, the device comprising:
a second touch panel provided on a face of the operation reception device opposite from a face on which the display panel and the first touch panel are provided, the second touch panel having a second touch sensor for detecting an operation on an outer face of the second touch panel;

a processor and a memory, the processor and memory being configured to:

determine whether or not a first coordinate position detected by the first touch sensor corresponds to a second coordinate position detected by the second touch sensor, the first coordinate position being a coordinate position where the operation on the display screen is detected by the first touch sensor and the second coordinate position being a coordinate position where the operation on the outer face of the second touch panel is detected;

control the display screen to display a screen through which a plurality of page images to be edited are designated, based on the determination that the first coordinate position corresponds to the second coordinate position;

receive an editing operation on the plurality of page images designated through the screen displayed on the display screen; and perform a predetermined editing corresponding to the received editing operation on the designated plurality of image pages, wherein designation of start and end pages to be edited can be received through the screen displayed on the screen display, and wherein the start page is designated based on the operation on the display screen detected by the first touch sensor, and the end page is designated based on the operation on the outer face of the second touch panel.

2. The operation reception device according to claim 1, wherein the at least one page image is included in a document of plural pages, the editing operation on the designated plurality of image pages is any at least one of a delete operation, an extract operation, an insert operation, a copy operation, and a print operation of a part or all of images of the document, and the predetermined editing is any at least one of deletion, extraction, insertion, copying, and printing of the designated plurality of image pages.

3. An operation reception method for an operation reception device including a display panel having a display screen, and a first touch panel having a first touch sensor for detecting an operation on the display screen, the method comprising:

a determination step of determining whether or not a first coordinate position detected by the first touch sensor corresponds to a second coordinate position detected by a second touch sensor on a second touch panel, the first coordinate position being a coordinate position where an operation on the display screen is detected by the first touch sensor and the second coordinate position being a coordinate position where an operation on an outer face of the second touch panel, the second touch panel being provided on a face of the operation reception device opposite from a face on which the display panel and the first touch panel are provided;

a display control step of controlling the display screen to display a screen through which a plurality of page images to be edited are designated, based on the determination step determining that the first coordinate position corresponds to the second coordinate position;

an operation reception step of receiving an editing operation on the plurality of page images designated through the screen displayed on the display screen by the display control step; and an editing step of performing predetermined editing corresponding to the editing operation on the designated plurality of image pages received in the operation reception step, wherein designation of start and end pages to be edited can be received through the screen displayed on the screen display, and wherein the start page is designated based on the operation on the display screen detected by the first touch sensor, and the end page is designated based on the operation on the outer face of the second touch panel.

4. A non-transitory computer-readable storage medium storing a program for causing a computer to execute an operation reception method for an operation reception device including a display panel having a display screen, and a first touch panel having a first touch sensor for detecting an operation on the display screen, the method comprising:

a determination step of determining whether or not a first coordinate position detected by the first touch sensor corresponds to a second coordinate position detected by a second touch sensor on a second touch panel, the first coordinate position being a coordinate position where an operation on the display screen is detected by the first touch sensor and the second coordinate position being a coordinate position where an operation on an outer face of the second touch panel, the second touch panel being provided on a face of the operation reception device opposite from a face on which the display panel and the first touch panel are provided;

a display control step of controlling the display screen to display a screen through which a plurality of page images to be edited are designated, based on the determination step determining that the first coordinate position corresponds to the second coordinate position;

an operation reception step of receiving an editing operation on the plurality of page images designated through the screen displayed on the display screen by the display control step; and an editing step of performing predetermined editing corresponding to the editing operation on the designated plurality of image pages received in the operation reception step, wherein designation of start and end pages to be edited can be received through the screen displayed on the screen display, and wherein the start page is designated based on the operation on the display screen detected by the first touch sensor, and the end page is designated based on the operation on the outer face of the second touch panel.

5. The operation reception device according to claim 1, wherein the editing operation is performed by sliding the coordinate positions to be respectively detected by the first and second touch sensors in a predetermined direction.

6. An image forming apparatus configured to be connected for communication with an operation reception device and configured to execute a predetermined editing performed on at least one page image by the operation reception device, wherein said operation reception device includes a display panel having a display screen, and a first touch panel having a first touch sensor for detecting an operation on the display screen, said operation reception device comprising:

a second touch panel provided on a face of the operation reception device opposite from a face on which the display panel and the first touch panel are provided, the second touch panel having a second touch sensor for detecting an operation on an outer face of the second touch panel;

a processor and a memory, the processor and memory being configured to:

determine whether or not a first coordinate position detected by the first touch sensor corresponds to a second coordinate position detected by the second touch sensor, the first coordinate position being a coordinate position where the operation on the display screen is detected by the first touch sensor and the second coordinate position being a coordinate position where the operation on the outer face of the second touch panel is detected;

control the display screen to display a screen through which a plurality of page images to be edited are designated, based on the determination that the first coordinate position corresponds to the second coordinate position;

receive an editing operation on the plurality of page images designated through the screen displayed on the display screen; and perform predetermined editing corresponding to the received editing operation on the designated plurality of image pages, wherein designation of start and end pages to be edited can be received through the screen displayed on the screen display, and wherein the start page is designated based on the operation on the display screen detected by the first touch sensor, and the end page is designated based on the operation on the outer face of the second touch panel.

7. The operation reception device according to claim 1, wherein when the first touch sensor detects the operation on the display screen and the second touch sensor does not detect the operation on the outer face of the second touch panel, the editing operation is received on the currently displayed page image which is to be edited.

* * * * *